United States Patent [19]

Chun

[11] Patent Number: 5,442,792
[45] Date of Patent: Aug. 15, 1995

[54] EXPERT SYSTEM COMPILATION METHOD

[75] Inventor: Robert K. Chun, Fullerton, Calif.

[73] Assignee: Hughes Aircraft Company, Los Angeles, Calif.

[21] Appl. No.: 258,359

[22] Filed: Jun. 10, 1994

Related U.S. Application Data

[63] Continuation of Ser. No. 926,467, Aug. 7, 1992, abandoned.

[51] Int. Cl.6 .......................... G06F 9/00; G06F 9/45
[52] U.S. Cl. .................................. 395/700; 364/972;
364/972.2; 364/972.3; 364/973; 364/274;
364/274.2; 364/274.3; 364/274.5; 395/902
[58] Field of Search ............................... 395/650, 700

[56] References Cited

U.S. PATENT DOCUMENTS

| | | | |
|---|---|---|---|
| 4,591,983 | 5/1986 | Bennett et al. | 364/403 |
| 4,648,044 | 3/1987 | Hardy et al. | 364/513 |
| 4,667,290 | 5/1987 | Goss et al. | 364/300 |
| 4,713,775 | 12/1987 | Scott et al. | 364/513 |
| 4,783,752 | 11/1988 | Kaplan et al. | 395/64 |
| 4,833,606 | 5/1989 | Iwasawa et al. | 364/300 |
| 4,924,408 | 5/1990 | Highland | 364/513 |
| 5,151,991 | 9/1992 | Iwasawa et al. | 395/700 |
| 5,204,939 | 4/1993 | Yamazaki et al. | 395/51 |

Primary Examiner—Kevin A. Kriess
Assistant Examiner—Michael T. Richey
Attorney, Agent, or Firm—W. K. Denson-Low

[57] ABSTRACT

A computer implemented compilation method or compiler and translator that automatically converts an interpretive rule-based expert system into compact, compiled, parallel Ada code. The present compiler customizes the compiled code for each desired knowledge base to produce just the minimum amount of Ada code needed to provide equivalent functionality to one pass of the inference engine. After parsing, a data dependency analysis is performed on a rule base to identify segments that can be executed in parallel. These segments are then compiled by a code generator to make use of Ada's multi-tasking capabilities. The present invention accelerates the execution speed of the compiled code, reduces memory requirements for the compiled code, and enables expert systems to be efficiently embedded into real-time procedural systems, especially those using Ada software and parallel processing hardware. The present invention also includes code slicing techniques that are applied to rule bases that extends the translation capability of the present compilation method to encompass backward chaining in rule-based expert systems. In contrast to conventional approaches, the present approach provides a customized translation for each individual expert system, yielding minimal procedural code that is highly efficient in terms of both execution speed and memory requirements. This makes it more feasible to embed the expert system into a real-time application where high execution speed and low memory usage are critical.

3 Claims, 5 Drawing Sheets

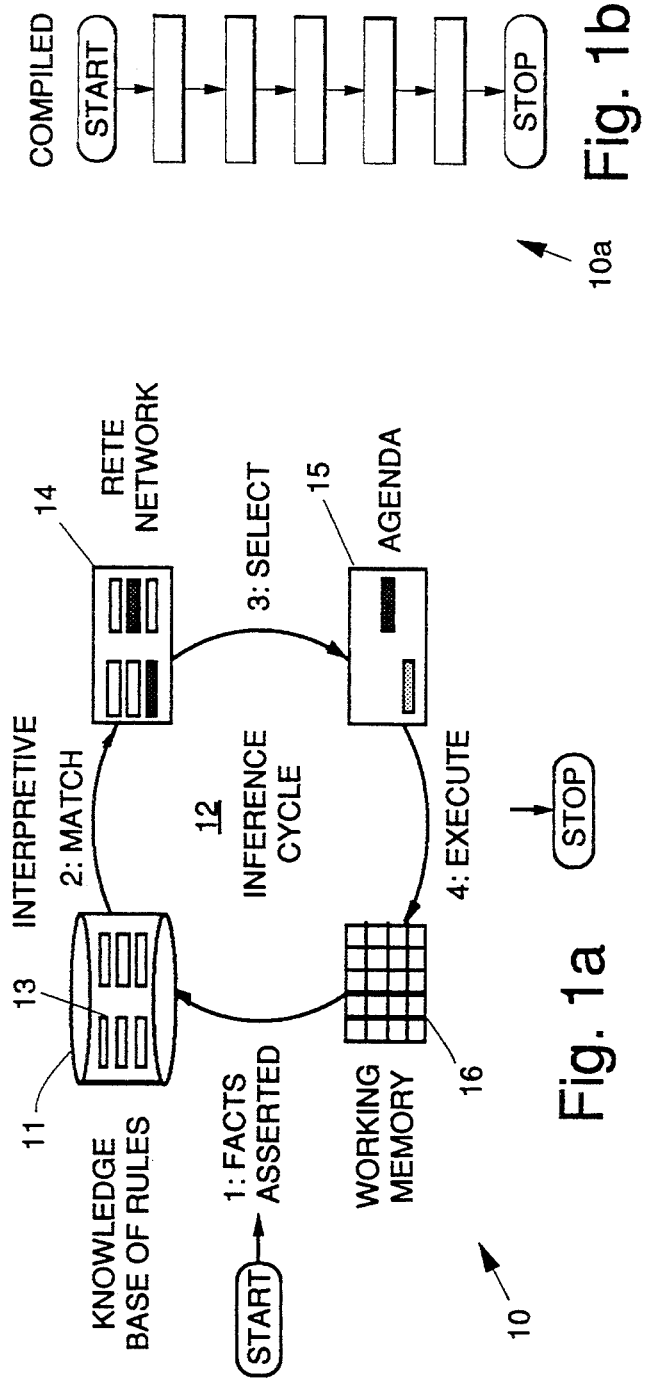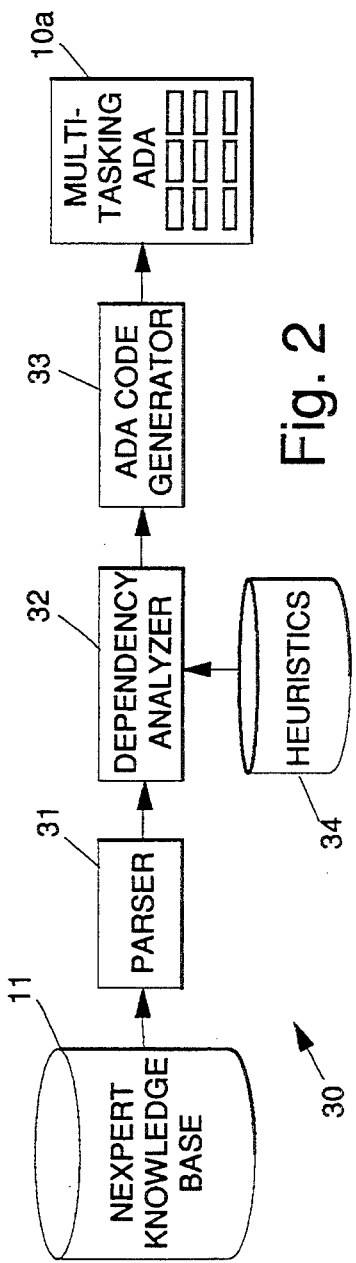

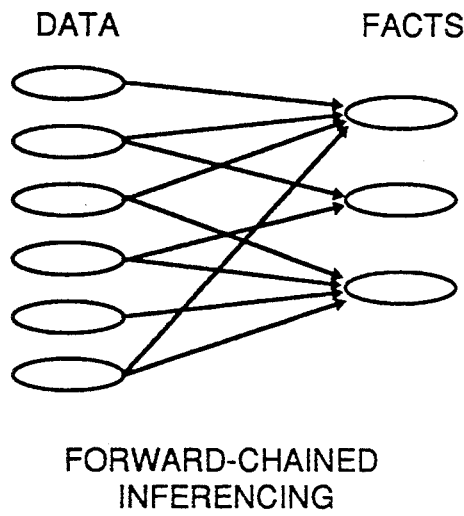
FORWARD-CHAINED
INFERENCING
Fig. 4a
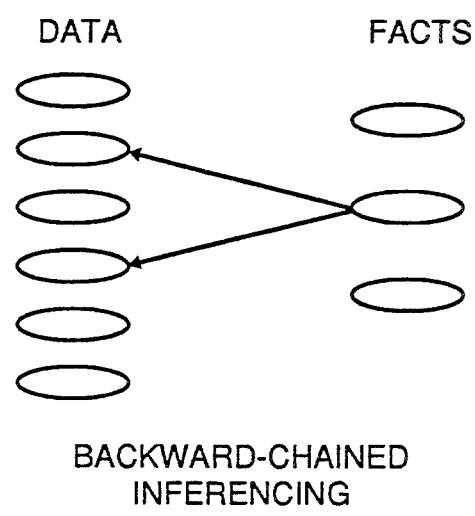
BACKWARD-CHAINED
INFERENCING
Fig. 4b
Fig. 5
| ORIGINAL PROGRAM | | SLICE ON VARIABLE A | |
|---|---|---|---|
| 1 | BEGIN | 1 | BEGIN |
| 2 | A := 1; | 2 | A := 1; |
| 3 | B := A + 1; | 4 | C := 3; |
| 4 | C := 3; | 5 | WHILE C > 0 DO |
| 5 | WHILE C > 0 DO | 6 | A := A + 1; |
| 6 | A := A + 1; | 10 | C := C - 1; |
| 7 | D := A + C; | 11 | END; |
| 8 | E := B + A; | 13 | PRINT (A) |
| 9 | F := D + E; | 14 | END; |
| 10 | C := C - 1; | | |
| 11 | END; | | |
| 12 | G := E + 1; | | |
| 13 | PRINT (A, D, F, G) | | |
| 14 | END; | | |

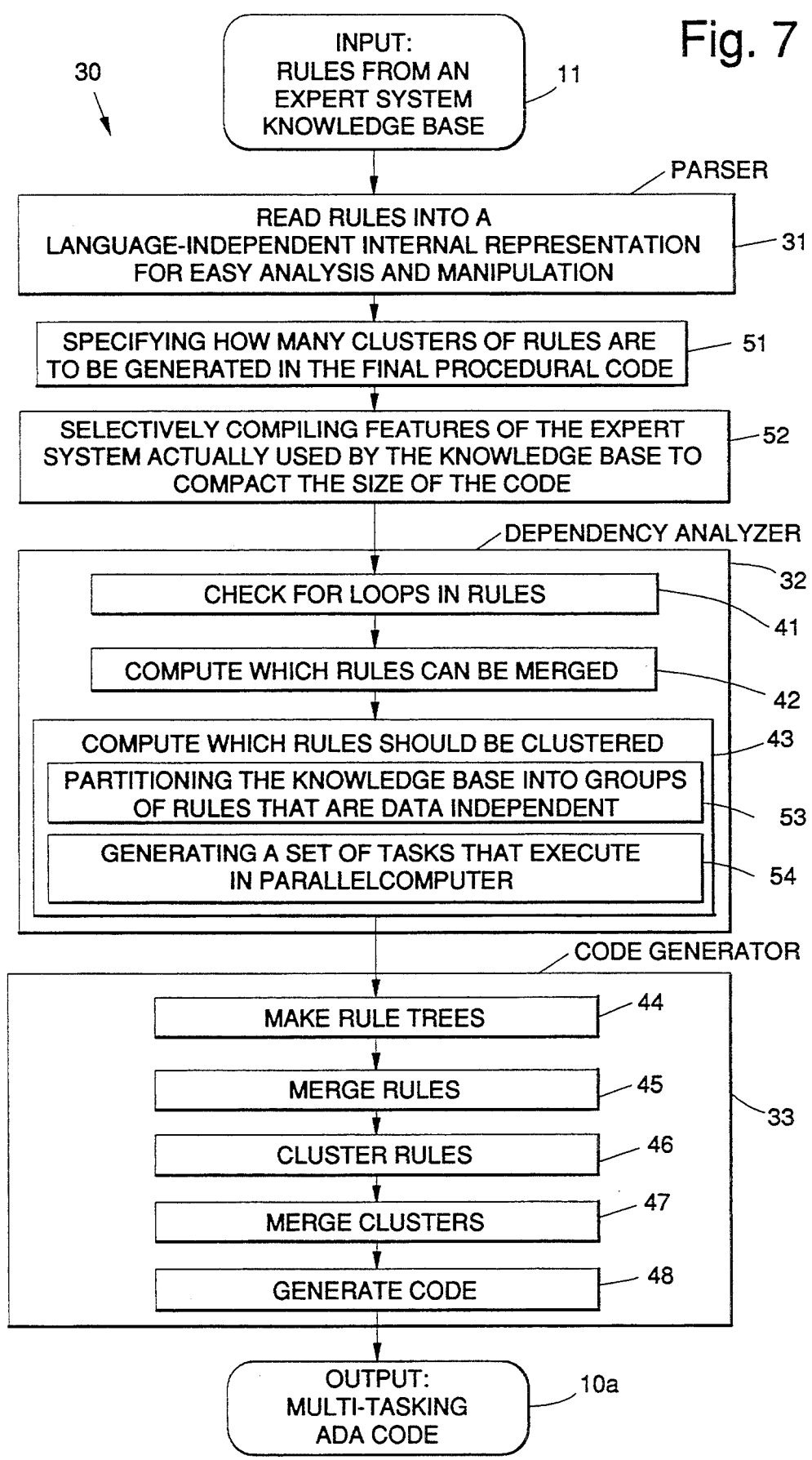

EXPERT SYSTEM COMPILATION METHOD

This is a continuation of application Ser. No. 07/926,467, filed Aug. 7, 1992, now abandoned.

BACKGROUND

The present invention relates generally to expert systems, and more particularly, to methods of compiling rule-based expert systems to provide multi-tasking code that achieves processing parallelism.

In recent years, rule-based expert systems have been proposed as a means for implementing complex decision-making processes for real-time embedded systems. While expert systems possess important advantages, there are currently significant limitations connected with their use in an embedded real-time operating environment. It is anticipated that many real-time paradigms will require inferencing throughputs exceeding those currently provided by typical expert system shells. The problem is expected to worsen as larger knowledge-based systems are developed to handle more sophisticated tasks. In addition, because expert systems are often prototyped using commercially available software tools, they are often incompatible with in-field hardware platforms, which tend to be more of a specialized, noncommercial, and high performance variety.

The interpretive nature of conventional expert systems make them slow and impractical to apply in applications requiring high computational throughputs. These expert systems, usually engineered on commercial development environments, are also difficult to embed and interface with system components written in conventional procedural languages, particularly those written in the Ada language. A few expert system shells purport to generate compiled representations of the rule base; however, their approach has been to migrate the entire inference mechanism down into procedural code, resulting in an extremely large, memory inefficient representation.

The areas of real-time performance, Ada interfaceability, and parallel processing for rule-based expert systems have not been generally addressed by commercial vendors of expert system shells. One instance of noncommercial reported research work does do compilation (see "Knowledge Base Compilation" by F. D. Highland and C. T. Iwaskiw in IJCAI-89). However, no mention is made of backward chaining capability as is employed in the present invention. Other research groups have investigated parallelization (see "Parallelism in Production Systems: The Sources and the Expected Speedup" by A. Gupta in Carnegie-Mellon Computer Science Dept. Tech Report CMU-CS-84-169, December 1984). However, their approach attempts to parallelize the entire inference engine (primarily the match phase) rather than use a custom approach as does the present invention. Thus, the amount of code produced by conventional approaches makes embedability impractical.

A paper entitled "Synthesis of Multitasking Ada Software for Real-Time Embedded Systems Using Knowledge Base Compilation", by Randall W. Lichota and Robert K. Chun, published in the Proceedings of Artificial Intelligence and Ada Conference, Nov. 14, 1990, examines three techniques that have been used to enhance expert system performance: rule compilation, parallel rule selection, and parallel rule execution. An approach is described in which a set of Ada tasks are synthesized from a knowledge base of rules. An analysis of the data and control dependencies is conducted to identify the parallelism implicit within a knowledge base. This information is then used to select distinct sets of rules that are used to derive individual procedures.

A paper entitled "Synthesis of Parallel Ada Code from a Knowledge Base of Rules", by Robert Chun et al., published in the Proceedings of the IEEE/ACM Symposium on Parallel and Distributed Processing, Dec. 1, 1991, generally describes the present invention as is described herein, but does not describe the full details of the compiler as is described herein.

Thus, it would be an advance in the art to have an expert system compilation tool that synergistically combines compilation, parallelization, compaction, real-time processing, backward-chained inferencing, and Ada interface capability.

SUMMARY OF THE INVENTION

A computer implemented compilation process and translator has been developed that automatically converts an interpretive rule-based expert system into compact, compiled, parallel Ada code. Previously existing techniques for compilation attempt to migrate an entire inference engine into equivalent procedural code. The present approach improves upon this performance by customizing the compiled code for each knowledge base to produce just the minimum amount of Ada code needed to provide equivalent functionality to one pass of the inference engine. Data dependency analysis is performed on the rule base to identify segments that can be executed in parallel. These segments are then compiled to make use of Ada's multi-tasking capabilities. The present invention accelerates the execution speed of the compiled code, reduces memory requirements for the compiled code, and enables expert systems to be efficiently embedded into real-time procedural systems, especially those using Ada software and parallel processing hardware. The present invention also includes code slicing techniques that are applied to rule bases that extends the translation capability of the present compilation process to encompass backward chaining in rule-based expert systems.

In contrast to conventional approaches, the present approach provides a customized translation for each individual expert system, yielding minimal procedural code that is highly efficient in terms of both execution speed and memory requirements. This makes it more feasible to embed the expert system into a real-time application where high execution speed and low memory usage are critical.

Using a sample expert system developed with a commercial package, the present invention produced functionally equivalent Ada code that executed over 100 times faster while using 19 times less memory. By comparing our current benchmarks against vendor quoted statistics, it is estimated that the present invention provides at least a tenfold increase in execution speed over commercially available expert system development environments.

Many applications that are candidates for an expert systems approach require high throughput, real-time processing speeds. In addition, there are also demands on embedability and interfaceability to Ada software. Unfortunately, the interpretive nature of expert systems often prevents them from meeting these specifications. By providing a means of automatically converting a rule-based expert system into compact, compiled, and parallel Ada code, the present invention allows these specifications to be met without compromising the rapid prototyping capability provided by the expert system development environment. The present invention allows knowledge-intensive expert systems software to be cost-effectively developed and delivered to address a wide range of applications.

Numerous commercial applications may also be addressed using the present invention. Although the present invention presently generates Ada code output, it is modularly designed to enable easy upgrade to generate an alternative target language. In cost sensitive markets, processing power and hardware memory are designed at minimal levels. Typically, running a sophisticated expert system on this type of hardware is infeasible. However, with the present invention, an equivalent expert system can be made compact and efficient enough such that an expert systems approach can be used to increase the intelligence, capability, and utility of the product.

The present invention addresses the needs of real-time expert systems, especially those that need to work in an Ada software environment. The present invention is unique in that it synergistically combines compilation, parallelization, compaction, real-time processing, and Ada interface capability. The areas of real-time performance, Ada interfaceability, and parallel processing for rule-based systems is thus addressed by the present invention.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIGS. 1a and 1b are diagrams pictorially illustrating how the compilation process in accordance with the present invention converts a slow iterative process into an efficient, streamlined representation thereof;

FIG. 2 shows the architecture of the compilation process in accordance with the principles of the present invention;

FIGS. 4a and 4b pictorially illustrate the effects of forward chaining and backward chaining, respectively, using either given data or desired facts as starting points of the inference cycle, respectively;

FIG. 5 shows an example of code slicing on generic procedural code;

FIG. 7 shows a detailed process flow diagram illustrating the compilation process in accordance with the principles of the present invention.

DETAILED DESCRIPTION

Figure 3:
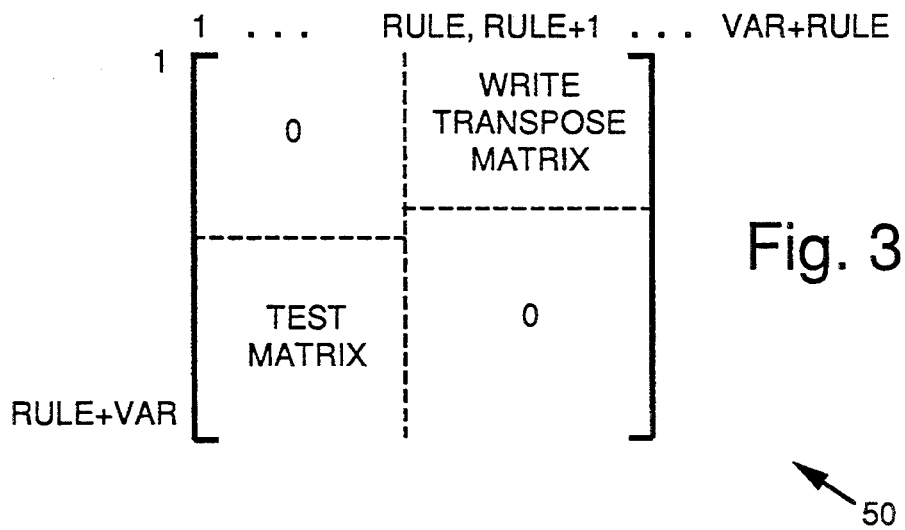
FIG. 3 shows an adjacency matrix useful in understanding loop detection performed in the dependency analyzer module of the compilation process of FIG. 3.

Ideally, it is desirable to preserve the convenience and cost-effectiveness of commercial, off-the-shelf software tools during prototype development while not sacrificing compatibility with requirements for the delivered version of the tools. The present invention facilitates this much needed capability by automatically converting a commercial software tool into multitasking Ada software that satisfies the performance and embedability demands of real-time expert systems. The present invention is a computer implemented process that involves synthesizing multitasking Ada code from a knowledge base of rules originally developed on a commercial expert systems tool. The present invention is a unique synergistic approach to compilation, compaction, and parallelization of expert systems to achieve real-time computing throughput from rule-based expert systems. The knowledge base and inference engine are treated as a single effective functional entity, thereby compiling, compacting, and parallelizing all aspects of the entire inference loop.

Referring to the drawing figures, and in accordance with the principles of the present invention, compilation of a knowledge base 11 (rule base) is accomplished by transforming the essence of the expert system 10 from its rule-based format shown in FIG. 1a, into a more streamlined, procedural language structure 10a as depicted in FIG. 1b. A built-in inference engine 12 (inference cycle 12) of the commercial expert system 10 eases programmer development by allowing rules 13 to be incrementally entered into the knowledge base 11 in an unordered fashion. Unfortunately, this convenience requires a significant amount of run time overhead associated with the iterative, interpretive, inference cycle 12. The well known typical inference cycle 12 proceeds as follows. First, facts are asserted and matched against the rules 13 that are oftentimes represented using a Rete Network 14 (see "Rete: A Fast Algorithm for the Many Pattern/Many Object Match Problem", by C. L. Forgy, in Artificial Intelligence, vol. 19, 1982). Those rules that match are placed on the agenda 15, from which one rule is selected to execute. The executed rule may post a new set of facts to working memory 16 which will, in turn, invoke another pass through the inference cycle 12. For a rule base 11 that has a static data and control structure, a significant amount of the processing time is unnecessarily expended in the match and select phases of the inference engine 12. Compilation can effectively predetermine the execution sequence for the rules 13 in the knowledge base 11 and instill organized control flow into the structure 10a of the generated procedural code. A one-time overhead task performed during the present compilation process avoids the problem of repeated search penalties during run time.

Compaction of code size is achieved in the present invention by selectively compiling only those features of the inference engine 12 actually used by a particular knowledge base 11. Commercial vendors have an incentive to incorporate as many features as possible into their expert system tool to boost the capability of their development shell relative to their competitors. Although these feature-laden tools enable the development of more sophisticated expert systems, they increase the memory size and slow the execution speed of the inference engine 12, making them worse from the aspect of real-time embedable systems. It has been observed that a typical knowledge base 11 utilizes only a small fraction of the total set of programmatic features provided by a commercial expert system development shell. By using a selective compilation strategy whereby only those programming constructs actually used by a particular knowledge base are converted into equivalent Ada code, unnecessary features can be eliminated offering an additional savings in terms of processing time, as well as, memory space.

Parallelization is accomplished in the present invention by performing an analysis of the data and control dependencies within the knowledge base 11 during compilation to identify and extract the implicit parallelism among rules. By partitioning the knowledge base 11 into groups of rules that are data independent, a set of tasks is generated that can execute in parallel on separate nodes of a multi-processor computer. Recognition of parallelism is a key element of the present invention. By performing a dependency analysis on the set of rules, those rules 13 that can be overlapped in execution time can be identified, thereby convening a sequential process into a parallel one.

Since the efficiency of the compiled software structure 10a is a function of the hardware platform (computer) on which it is to run, the compiler of the present invention customizes the transformation scheme as a function of the architecture of the target computer. For example, given the number of nodes available on a parallel processor computer, a heuristic goal for the compiler is to partition the rule base into the same number of equal-sized independent tasks.

The effectiveness of the present parallelization approach depends on the proper tradeoff of number of tasks versus size of tasks. For sufficiently fine-grained parallelism, the speedup to be gained from using a parallel implementation is offset by the presence of run-time overhead associated with the task invocation mechanism. The decision as to when parallelism may be effectively exploited is based on such things as fan-in, fan-out, complexity, and chain length characteristics of the rule base. By analyzing each knowledge base 11 and applying optimization heuristics, a custom compaction and parallelization strategy may be applied to obtain maximum throughput.

A prototype of the compiler of the present invention has been developed to demonstrate the effectiveness of the present approach. The compiler of the present invention was adapted to interface to a commercially available object oriented expert systems shell, known as Nexpert Object, available from Neuron Data. Ada was chosen as the target compiled language. Although the following discussion uses rule syntax peculiar to that of Nexpert and tasking mechanisms available in Ada, the concepts may be generically adapted to almost any rule-based expert system that needs to be converted into parallelized, compiled form.

The prototype was intended to operate on a subset of functions found in the Nexpert knowledge base 11. This subset of inferencing capability was defined in such a manner to accommodate the most pertinent and useful expert systems programming constructs present in the Nexpert expert system 10. One of the guidelines used during the identification of this subset of functions was to include inferencing capabilities that would be generic to all expert systems, not just those peculiar to the Nexpert software. This facilitates future expansion to accommodate knowledge bases developed using other vendor supplied expert systems 10.

Referring to FIG. 2, it shows the architecture of the compilation process 30 in accordance with the principles of the present invention. The present invention in its prototype form comprises a software program (or a comparable hardware processor) comprising a compilation method 30 that converts a Nexpert knowledge base 11 into multitasking code. The compilation method 30 of the present invention is comprised of three software modules or submethods: a parser 31, a dependency analyzer 32, and a code generator 33 as shown in FIG. 2. Heuristics 34 are provided to the dependency analyzer 32 as required as will be discussed below. A discussion of each of the three modules follows.

The first portion in the present compilation process requires parsing 31 the Nexpert knowledge (rule) base 11 into representative intermediate forms. The parser 31 makes use of compiler tools known as Lex and Yacc for syntactic and semantic analysis of the knowledge base 11. This implementation of parsing 31 the Nexpert knowledge base 11 was written in a modular fashion to allow easy modification or expansion of the interface to accommodate alternative knowledge bases 11.

The dependency analyzer 32 has the responsibility of detecting portions of the rule base 11 that can be executed in parallel. It recognizes data and control dependencies among the rules 13 and ensures that parallel execution of rule groups is functionally equivalent to the original rule base 11 when executed sequentially using the Nexpert inference engine 12. Its input is the intermediate form generated by the parser 31. The goal is the creation of distinct Ada tasks that comprise rules 13 or groups of rules 13 that can be executed in parallel with minimal interaction therebetween. Internally this analysis phase builds a graph-like structure of read/write dependencies among the rules and working memory elements, as is indicated in FIG. 3, and which will be described in more detail below. Heuristic tradeoffs are done to determine the optimal degree of rule merging, rule clustering, and the number of tasks to be generated and is represented by the heuristics 34 coupled to the dependency analyzer 32. User specified parameters can adjust (and in extreme cases, override) tradeoffs to better suit the target hardware platform or computer on which the compiled code is to run. The dependency analyzer 32 performs three main tasks: loop detection 41, rule merging 42, and independent rule clustering 43. Detailed descriptions of these three steps are provided later.

The code generator 33 uses as inputs the merged rules 13 and the clustered rules 13 produced by the dependency analyzer 32, and the rules 13 in the knowledge base 11 extracted by the parser 31. The user specifies how many clusters of rules 13 are to be generated in the final code. This number serves to limit the degree of partitioning performed on the set of rules 13 since certain knowledge bases 11 may generate an overabundance of independent rules 13 (all going into their own cluster) as compared to the available number of processors. In general, the overhead expended on task invocation is minimized on one pass of the knowledge base 11 when the number of tasks matches the number of available processors. It then follows that processing time is minimized if all tasks are nearly the same size.

The prototype was run with various knowledge bases 11 as inputs. For timing measurements, performance of the compiler (compilation process 30) generated Ada code was evaluated using two knowledge bases 11. The Nexpert shell was run on a Macintosh computer workstation. Two hardware setups were used as benchmarks for the compiled knowledge base structure 10a—a nine processor Sequent Balance and a single Sequent processor for sequential comparison. Using compilation and compaction alone, and normalizing processor power by using a throughput metric of rules executed per second per MIP (million instructions per second), the compiled code ran 132 times faster and was 19 times smaller in code size over that of the Nexpert expert system 10.

The compilation and parallelization techniques described above are applicable to forward-chained knowledge bases 11. Conceptually, forward-chained expert systems take all available data as input and produce all possible derivable facts as output as is shown in FIG. 4a. In certain time-critical instances, however, it may be deemed prudent to focus attention on just a few of the many output variables. Backward chaining in expert systems can be used as a means to increase processing speed of the inference cycle if only some facts are needed as output. Time is saved since the expert system performs the minimal amount of work by executing only the minimal number of rules needed to process the minimal set of input data needed to verify or refute only those fact(s) of interest as specified by the user. Essentially, the expert system works backwards by starting with the output fact(s) that the user wants verified and proceeds to find the input data that is needed to compute the fact(s), as is shown in FIG. 4b. Because rules 13 are generally encoded in the forward manner in the knowledge base 11, a typical compilation process would find it difficult to emulate the operational efficiency of backwards chaining since the control structure would most likely have been compiled in a forward chained procedural representation.

The present invention includes the capability to produce compiled code that efficiently emulates backward-chained inferencing 12 by performing code slicing on the rule base 11. Code slicing is a method of identifying the minimal subset of lines from a program needed to correctly compute certain output variables. For example, assume that an existing program generates several primary outputs. Only one of those outputs is required and it is desired to eliminate the frivolous lines of code that compute the non-required outputs. Code slicing extracts a minimal subset program from the original program that correctly generates the desired output, as is shown in FIG. 5. This technique has been suggested for procedural languages; however, the present invention is adapted to apply the concept of slicing to rule-based languages to achieve backward-chaining. In particular, backward-chained inferencing in expert systems is performed to reduce the search space, i.e. to obtain answers to only a subset of the expert system's primary outputs. By performing a slice on the rule base on the output for which it is desired to backward chain, the present invention produces a minimal set of procedural code needed to compute that output, thereby duplicating the process and achieving the benefits of backward chaining in the procedural code.

Code slicing with respect to computer programs is generally well-known in the art and is generally described in "Programmers Use Slices When Debugging", by Mark Weiser published in Communications of the ACM, Volume 25, Number 7, July 1982, and "Program Slicing", by Mark Weiser published in IEEE Transactions on Software Engineering, Vol. SE-10, No. 4, July 1984. However, the code slicing aspects of the present invention that are directed toward code slicing applied to expert systems are not generally known.

Figure 6:
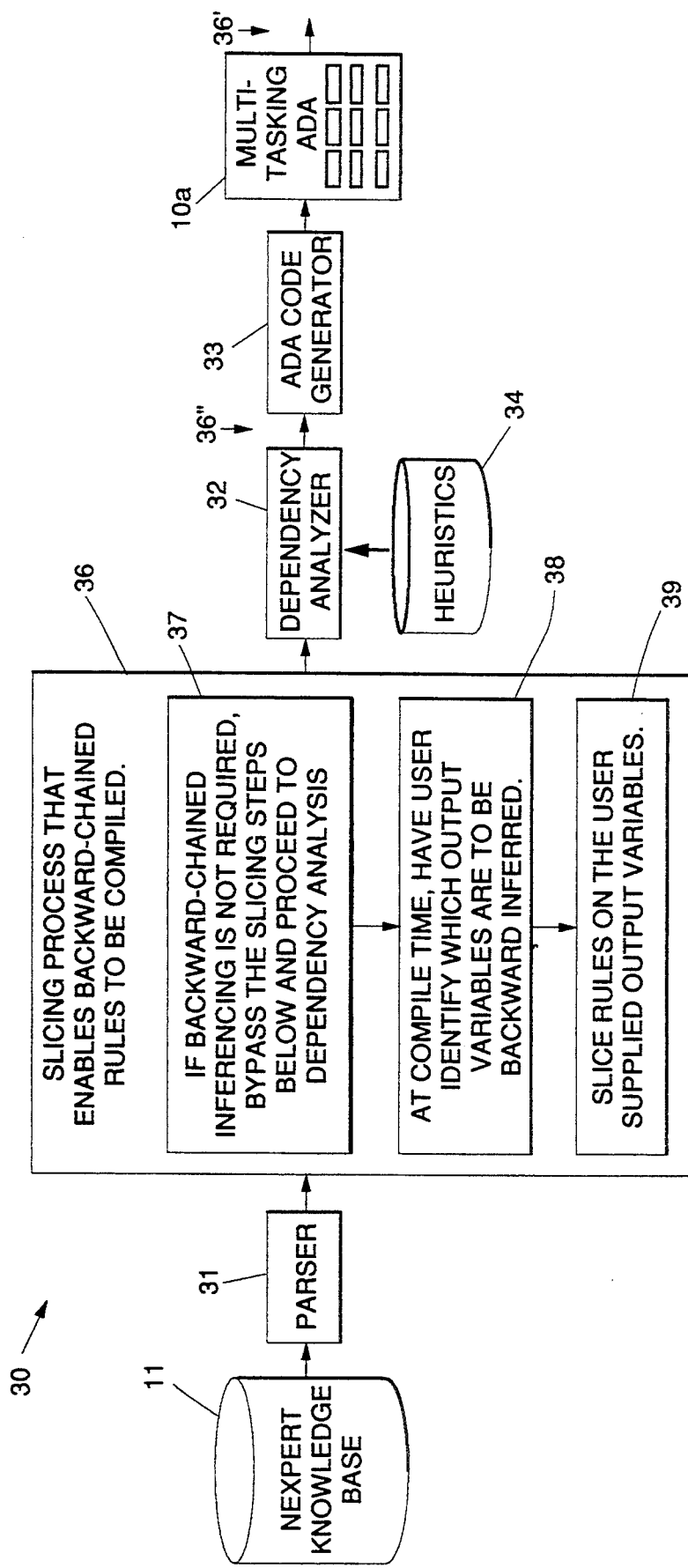
FIG. 6 shows how the compilation process described can be augmented using code slicing to extend the capability of the present invention to encompass backward-chained rules.

In the present implementation, if compilation of backward-chained rules is specified, slicing 36 is performed as an additional step between the parser 31 and dependency analyzer 32, as is shown in FIG. 6. Alternatively, the slicing 36 may be performed on the Ada code 10a after code generation 33, as is indicated by arrow 36', or on the internal representation of the rules after dependency analysis 32, as is indicated by arrow 36", or at any other intermediate point of the compilation process 30. Since slicing 36 effectively discards portions of rules/code that do not pertain to the computation of the variable(s) of interest, it is more efficient to perform the slicing 36 at an early stage. The slicing 36 is implemented by determining if backward chained inferencing is required, indicated by step 37. If it is not, then the method 30 skips to the dependency analysis step 32. If it is required, then a user identifies which output variables are to be backward inferred, indicated by step 38. Once the variables are identified, the rules are sliced based upon the user supplied output variables, indicated by step 39.

With reference to FIG. 7, it shows a detailed process flow diagram illustrating the compilation process 30 in accordance with the principles of the present invention. Rules 13 are first input from an expert system knowledge base 11 into the present compilation process 30. Then, the first step in the compilation process 30 requires parsing 31 the Nexpert knowledge base 11 into intermediate forms. The parser 31 uses the compiler tools Lex and Yacc for the syntactic and semantic analysis of the knowledge base 11. Optional steps may be performed on parsed data which includes specifying how many clusters of rules are to be generated in the final procedural code, indicated in step 51, and compacting the size of the code by selectively compiling those features of the inference engine of the expert system actually used by the knowledge base, indicated in step 52.

The dependency analyzer 32 has the responsibility of detecting portions of the rule base 11 that can be executed in parallel. It recognizes data and control dependencies among the rules 13 and ensures that parallel execution of the rule groups is functionally equivalent to the original rule base 11 when executed sequentially using the Nexpert inference engine 12. Its inputs are the intermediate forms generated by the parser 31. The goal is the creation of distinct Ada tasks that consist of rules 13 or groups of rules 13 that can be executed in parallel with minimal interaction. Heuristic tradeoffs are done to determine the optimal degree of rule merging, rule clustering, and the number of tasks to be generated. User specified parameters can adjust or override tradeoffs to better suit the target computer.

Using the information provided by the parser 31, four internal matrices are built as illustrated at 50 in FIG. 3. Each matrix is comprised of boolean entries with rows corresponding to all the distinct variables appearing in the knowledge base 11 and columns corresponding to the rule identifiers in the knowledge base 11. A boolean coordinate is marked '1' if that variable (row) appears in the rule (column) in the context of the matfix. The four matrices are: test, read, write, and the logical 'or' of all three matrices. The test matrix identifies variables that are tested in a conditional clause on the left hand side of a rule 13. The read and write matrices are for those variables appearing on the right hand side of a rule 13 that are referenced and updated, respectively. The data dependency analyzer 32 performs three major functions: loop detection 41, rule merging 42, and independent rule clustering 43. Rule merging 42 and independent clustering 43 work jointly while loop detection 41 operates as a stand-alone process in the current prototype. All three functions performed by the data dependency analyzer 32 make use of some combination of the test, read, and write matrices for input. Independent clustering 43 is comprised of two steps that include: partitioning the knowledge base into groups of rules that are data independent, indicated in step 53; and generating a set of tasks that execute in parallel on separate nodes of a multi-processor computer, indicated in step 54.

The compiler 30 must recognize loops in the rule base 11 and break these rules 13 into a procedural do-while (or other) loop. Loop detection 41 is a two step process and proceeds as follows. First is the generic loop detection 41 algorithm, which, given an adjacency matrix 50 for a graph G, can determine whether or not any node of G is contained in a loop. The second step identifies the rules 14 contained in each loop of G.

The graph G, and its adjacency matrix 50, is built from the test and write matrices 51 of the knowledge base 11. In general, G is a bipartite graph where one set of noninteracting nodes corresponds to the variables and another noninteracting set corresponds to the rules 13. A rule $R_i$ that writes a variable $V_j$ represents an edge in G from $R_i$ to $V_j$. A rule $R_i$ that tests a variable $V_j$ represents an edge in G from $V_j$ to $R_i$. As implied, the knowledge base graph G is a directed graph that is searched for loops among rules 13. For loop detection 41, the actual graph G need not be built; only its adjacency matrix 50 (shown in FIG. 3) is required.

Simply detecting the presence of loops in G can be done by performing a transitive closure on G. That is, the transitive closure of the adjacency matrix, M*, represents the reachability matrix of the original graph G. The transitive closure is performed as follows (let M=adjacency matrix of graph G):

```
initialize M* <- M
    for i from 1,2,...n (n is # of nodes in G = rule + var)
        for j from 1,2,..n
            if M*(j,i) = 1 then
                for k from 1,2,..n
                    M*(j,k) = M*(j,k) v M*(i,k)
End.
```

This algorithm yields M*, the reachability of G. It follows that any '1' in the diagonal of M* signifies a node that resides in a loop of G.

Once it is determined that G contains loops, a modified depth-first search algorithm run on the nodes contained in loops yields the loop paths. Using M and M* from above, the loop recovery algorithm is stated as follows:

```
for each '1' in M*(i,i) => i in [1..rule]
    for each '1' in M(i,k) => k in [rule + 1..rule+ var]
        for each '1' in M(k,j) => j in [1..rule]
            if M*(j,i) is '1' then return_the_paths (j,...,i)
                for each path (j,...,i) returned,
                    output the loop (i,k,j,...,i)
    End.
The 'return_the_paths (j,...,i)' algorithm works as follows:
    if j has been visited return NULL
    if j = i return i
    mark j visited
    for each node k adjacent to j (M(j,k) = '1')
        if M*(k,i) = '1' then
            L = paths(k,i)
            if L <> NULL then return (j,L)
End.
```

Often, rules 13 are chained in structure whereby the results of one rule 13 feed directly into another via an intermediate variable or hypothesis that is not really visible to the external calling program. The potential for merging the two chained rules 13 into a single, longer one is attractive since the number of cycles expended as overhead in firing each rule 13 separately will be reduced. Rule merging 42 can be accomplished in the following manner. Using the test and write matrices 51, the primary inputs and outputs of the knowledge base 11 are identified. Primary inputs are variables that appear in a test statement of a rule 13 but never appear in a write action of a rule 13. Conversely, the primary outputs are those variables that are generated as results of a write action of a rule 13, but are never required as part of a test of any rule 13. The variables that are not identified as either primary inputs or primary outputs are therefore intermediate variables that merely serve as communication links between two (or more) rules 13. Two rules 13 that are independent except for one or more shared intermediate variable(s) are chained rules and are merged. The dependency analyzer 32 performs such a heuristic rule/variable elimination. This process is coined "heuristic" in that a threshold is set on how many rules 13 can be eliminated into one single Ada construct. Such a threshold is subjective and serves to avoid collapsing entire clusters into single, unmanageable procedural chunks.

When it is detected that two (or more) rules 13 can be merged together, it seems appropriate to eliminate the intermediate variable of the merge. Yet, a variable that is intermediate to the merging process is not necessarily excluded from being used as a input/output by external processes interacting with file Nexpert knowledge base 11. This information cannot be derived from the contents of the knowledge base 11 alone. For this reason, the user is prompted as to whether the variable can be eliminated without affecting the desired input/output of the knowledge base 11 (i.e. whether the intermediate variable is accessed externally or not). Initial merging is performed regardless of this answer; however, full rule merging is applied only when the user prompted response is "OK to delete". If rule i can be merged into rule j on variable k, then the left hand side and right hand side of rule i are merged into rule j unconditionally (initial merging). Now, if variable k is confirmed "OK to delete", then rule i can be removed from the knowledge base 11. This is shown below:
  $r_i$: if a= ≧b—Need user confirmation on deleting
  $r_j$: if b,c= ≧d—variable b.
  Merging results:
  "OK to delete b" if a,c= ≧d
  "Not OK to delete b": if a= ≧b, and if a,c= ≧d In certain cases, two rules $R_i$ and $R_j$ may be found 'mergeable' on variable x, but rules $R_i$ and $R_k$ involve a conflict on x. Instead of abandoning the merge of $R_i$—$R_j$, it proves useful to merge $R_i$ into $R_j$ yet still keep rule $R_i$ intact. The benefits of this approach comes in the independent clustering algorithm where $R_i$ and $R_j$ are found dependent if unmerged, yet independent if merged.

For example:
  $R_i$: if a,e= ≧b
  $R_j$: if b,c= ≧d
  $R_k$: if ~e,b= ≧f
becomes:
  $R_i$: if a,e= ≧b
  $R_j$: if a,e,c= ≧d $R_k$: if $\sim e, b = \geq f$ It becomes evident that merging on general variables becomes a nondeterministic optimization problem. In the merging implemented, only hypotheses are considered as 'mergeable' intermediate variables. The Nexpert rule structure facilitates merging on hypotheses since it is clear as to what the value of the intermediate variable should be (i.e., a fired rule sets its hypothesis true and subsequent rules read this hypothesis as part of their tests). The complexity of merging on variables other than hypotheses should be evident from the two not 'mergeable' cases below.

Consider the following rules:
if $a = \geq b$, $c := 2$
if $c = 2 = \geq d$
that can be merged into
if $a = \geq d$, $c := 2$ (if hypo b is "OK to delete")
But now consider:
if $a = \geq b$, $c := x$
if $c = 2 = \geq d$
Merging can only be done if x can be bound to the value 2.

As another example, consider the rules:

| if c = 0, q > 0 | => H1, q: = q + 1, m: = m + 1 |
| if c = 1 | => H2, m: = 0, q: = q + 1 |
| if m = 3 | => H3, t: = 4 |

The sharing of variable m implies some merging may be possible—but close examination reveals that all three rules 13 must be kept intact as is.

The final goal of the dependency analyzer 32 is the formation of independent rule clusters 43 that can execute in parallel. Conceptually a cluster of rules 13 can be considered an "island of knowledge" because the grouped rules concentrate on independent subproblems. Putting rules 13 into different clusters (tasks) requires determining the dependencies between rules 13 so that rules that must be fired sequentially can be placed in the same task. With different tasks accessing the same data, three different data control strategies evolve for manipulating the data. Both reading and writing can occur either exclusively or concurrently between tasks. Thus, an exclusive read exclusive write (EREW) strategy implies that only one task may be reading or writing a specific variable at any given instance in execution. Two other important strategies are: concurrent read exclusive write (CREW), where multiple tasks may be reading a specific variable but only one task can write to a specific variable at any given instance; and concurrent read concurrent write (CRCW), where multiple tasks may be reading from or writing to (but not both) a specific variable at any point in the execution. A fourth combination exclusive read concurrent write exists but is of little interest since if a model can allow concurrent write it can certainly allow concurrent read.

Rule dependencies can be defined for xRxW systems as follows:
EREW:
rule i reads and/or writes var k
rule j reads and/or writes var k = $\geq$ rules i,j dependent
CREW:
rule i reads var k
rule j reads var k = $\geq$ rules i,j independent
rule i reads var k
rule j writes var k = $\geq$ rules i,j dependent
rule i writes var k
rule j writes var k = $\geq$ rules i,j dependent
CRCW:
rule i reads var k
rule j writes var k = $\geq$ rules i,j dependent
rule i writes var k
rule j writes var k = $\geq$ rules i,j independent
rule i reads var k
rule j reads var k = $\geq$ rules i,j independent The exclusive read exclusive write strategy does not provide much flexibility for parallel execution; however, it is useful for identifying rule groupings in expert systems that is valuable when utilizing the dependency analyzer 32 as part of a computer-aided software engineering environment. Assume a scenario where the user "touches" rule $R_i$. The system, through use of the dependency analyzer, informs the user of what rules 13 are grouped with $R_i$ thereby allowing the user to examine the full effects of "touching" $R_i$. Concurrent read exclusive write is a more practical implementation strategy for obtaining speedup since the majority of parallel systems allow concurrent reading. Concurrent read concurrent write yields the greatest amount of independence from the dependency analyzer 32 since clusters are built around explicitly tied rules 13 (right-hand-sides driving left-hand-conditions). The method of clustering is left as a compiler invocation option, though an ideal scenario of knowledge base partitioning may be viewed as exclusive read exclusive write followed by concurrent read concurrent write within these clusters. That is, exclusive read exclusive write generates functionally independent sub-problems, and within each exclusive read exclusive write group, a concurrent read concurrent write analysis is employed to determine independent actions performed within an island of knowledge. When an entire island (exclusive read exclusive write task) is scheduled to run, the concurrent read concurrent write sub-components are sent to sets of processors. A knowledge base 11 built around sound software engineering methods implicitly comes with predefined islands of knowledge and the present compiler serves as a parallelization identifier within the tasks.

Building independent clusters is done as an incremental algorithm that starts with one rule 13 per cluster and then incrementally tries to merge pairs of clusters together until the remaining number of clusters has reached the target. The algorithm shown below defines a "distance" between two rules 13 and picks the clusters to merge according to this distance function.

Let R denote the test_or_read matrix, W the write matrix.

Let items = #items in rule $r_i$ + #items in rule $r_j$.

Let crcw = #items such that (R(x,i) AND W(x,j)) OR (W(x,i) AND R(x,j)) all vars x.

Let crew = #items such that (W(x,i) AND W(x,j)) all vars x.

Let erew = #items such that (R(x,i) AND R(x,j)) all vars x.

CRCW→distance($r_i, r_j$) = items/crcw
CREW→distance($r_i, r_j$) = items/(crew + crcw)
EREW→distance($r_i, r_j$) = items/(erew + crew + crcw)

This incremental algorithm has the benefit of controlling the number of target tasks by manipulating the target variable, where a target value of '1' yields the complete set of independent clusters in the rule base 11.

The code generator 33 of the compiler 30 proceeds through five major steps. The code generator 33 needs as inputs the merged rules 13 produced by the dependency analyzer 32, the clustering of rules 13 produced by the dependency analyzer 32, and the knowledge base rules 11 extracted by the parser 31. The user can specify how many clusters of rules 13 are to be generated in the final code. This number serves to limit the degree of partitioning performed on the set of rules since certain knowledge bases 11 may generate an overabundance of independent rules 11 (all going into their own cluster) as compared to the available number of processors. In general, the overhead expended on task invocation is minimized on one pass of the knowledge base when the number of tasks matches the number of available processors. It then follows that processing time is minimized if all tasks are nearly the same size. The flow of the code generator 33 is shown below:

The first step is to make rule trees 44 (expression trees 44)—each rule 13 is built into an expression tree 44 for fast/easy manipulation at later points in the code generation. The second step is to merge rules 45—using the input from the dependency analyzer, this process will merge appropriate expression trees 44 from the first step 44 into single rules. The third step is to place rules in clusters 46—using input from the dependency analyzer, this process will build an array of lists specifying which rules are to exist in the same clusters. The fourth step is to merge clusters 47 to obtain the desired target number—in the case that the number of clusters generated in the clustering step 46 is larger that the user intends, this process will combine together the clusters produced in the clustering step 46 until the target number of clusters is reached. The fifth step is to generate code 48—once the expression trees 44 are built and the clusters 46 defined, the target code can be built. The syntax/placement of the rules is easily derived from the above steps.

Three Ada tasking methodologies for a time-shared multi-processor platform are currently implemented: (a) Sleep—tasks are assumed instantiated from the point of view of the knowledge base. Upon execution, all rule tasks only need be waken up to commence processing. (b) Task setup—the overhead of instantiating the rule tasks is assumed to be a function of the knowledge base. To initiate execution, all tasks must first be instantiated and then awakened. (c) Spin—tasks are again assumed instantiated by the knowledge base. Further, each rule task is kept active and waiting to execute by looping on a global condition. Upon execution, the knowledge base driver sets this global condition, in effect, broadcasting a 'go' signal to all tasks.

Figure 8:
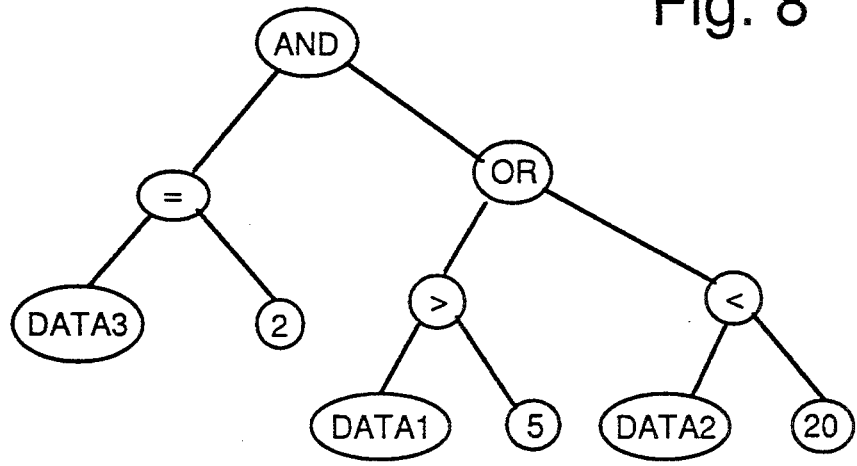
FIG. 8 shows an expression tree generated by the code generator module of the compilation process of FIG. 7.

The rule expression trees 44 are established by reading the intermediate rule file produced by the parser 31. This first step creates an array of rule trees 44, one element for each rule 13 in the rule base 11. An individual array element is comprised of an expression tree 44 for the left hand side and an expression tree 44 for the right hand side of the rule 13. In Nexpert, a rule 13 is comprised of a left hand side of condition elements, each of which must be true for the rule 13 to fire. Thus, the left hand side expresses an AND of condition elements; consequently, the expression tree 44 for an individual rule's left hand side appears as in FIG. 8. The right hand side of a rule 13 details the set of actions to perform upon rule firing. These are sequentially executed statements in the prototype and thus may be stored as a single expression tree 44.

Thus there has been described new and improved methods of compiling rulebase expert systems to provide multi-tasking code that achieves processing parallelism. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A computer implemented method for generating compiled multi-tasking procedural expert system object code from a pre-existing rule based expert system that includes a knowledge base having rules and a comprehensive inference engine, the method comprising the steps of:

parsing the knowledge base into intermediate forms including test, read, and write matrices which represent the rules of the knowledge base;

analyzing the intermediate forms as to data and control dependencies to pre-order the rules and to identify rules that are data independent and to extract parallelism among the rules, and on the basis of such analysis:

(a) merging sequentially ordered single rules into merged rules when possible thereby collapsing two or more single rules into a single merged rule and increasing efficiency by eliminating intermediate variables from computation;

(b) ordering and clustering into respective data independent clusters single rules and merged rules that must be fired sequentially such that single rules and merged rules that must be fired sequentially are ordered and clustered in the same cluster; and (c) grouping data independent clusters into a predetermined number of data independent groups of clusters, wherein the predetermined number depends on the hardware on which the procedural expert system object code is to be executed;

synthesizing in procedural code the functional behavior of only the portion of the comprehensive inference engine that is used by the knowledge base;

generating multi-tasking procedural source code implementing said data independent groups of clusters of rules and merged rules and said portion of said comprehensive inference engine synthesized in procedural code such that said data independent groups of clusters will be executed in parallel; and generating compiled multi-tasking procedural expert system object code from said source code.

2. A computer implemented method for generating compiled multi-tasking procedural expert system object code from a pre-existing rule based expert system that includes a knowledge base having rules and a comprehensive inference engine, the method comprising the steps of:

parsing the knowledge base into intermediate forms including test, read, and write matrices which represent the rules of the knowledge base analyzing the intermediate forms as to data and control dependencies to pre-order the rules and to identify rules that are data independent and to extract parallelism among the rules, and on the basis of such analysis:

(a) merging sequentially ordered single rules into merged rules when possible thereby collapsing two or more single rules into a single merged rule and increasing efficiency by eliminating intermediate variables from computation;

(b) ordering and clustering into respective data independent clusters single rules and merged rules that must be fired sequentially such that single rules and merged rules that must be fired sequentially are ordered and clustered in the same cluster; and (c) grouping data independent clusters into a predetermined number of data independent groups of clusters, wherein the predetermined number depends on the hardware on which the procedural expert system object code is to be executed;

synthesizing in procedural code the functional behavior of only the portion of the comprehensive inference engine that is used by the knowledge base;

generating multi-tasking procedural source code implementing said data independent groups of clusters of rules and merged rules and said portion of said comprehensive inference engine synthesized in procedural code such that said data independent groups of clusters will be executed in parallel;

generating compiled multi-tasking procedural expert system object code from said source code; and code slicing said procedural system object code pursuant to user supplied output variables to produce a minimal representation of the object code sufficient to compute the user specified output variables.

3. A computer implemented method for generating compiled multi-tasking procedural expert system object code from a pre-existing rule based expert system that includes a knowledge base having rules and a comprehensive inference engine, the method comprising the steps of:

parsing the knowledge base into intermediate forms including test, read, and write matrices which represent the rules of the knowledge base;

code slicing said intermediate forms pursuant to user supplied output variables to produce a minimal representation of the knowledge base rules in intermediate form sufficient to compute the user specified output variables;

analyzing the remaining minimal intermediate forms as to data and control dependencies to pre-order the rules and to identify rules that are data independent and to extract parallelism among the rules, and on the basis of such analysis:

(a) merging sequentially ordered single rules into merged rules when possible thereby collapsing two or more single rules into a single merged rule and increasing efficiency by eliminating intermediate variables from computation;

(b) ordering and clustering into respective data independent clusters single rules and merged rules that must be fired sequentially such that single rules and merged rules that must be fired sequentially are ordered and clustered in the same cluster; and (c) grouping data independent clusters into a predetermined number of data independent groups of clusters, wherein the predetermined number depends on the hardware on which the procedural expert system object code is to be executed;

synthesizing in procedural code the functional behavior of only the portion of the comprehensive inference engine that is used by the knowledge base;

generating multi-tasking procedural source code implementing said data independent groups of clusters of rules and merged rules and said portion of said comprehensive inference engine synthesized in procedural code such that said data independent groups of clusters will be executed in parallel; and generating compiled multi-tasking procedural expert system object code from said source code.

* * * * *